May 19, 1936. F. C. STEVEY 2,041,306
AUTOMATIC COORDINATOR FOR MAIN AND AUXILIARY SOURCES OF ELECTRICITY
Filed April 14, 1934 2 Sheets-Sheet 2
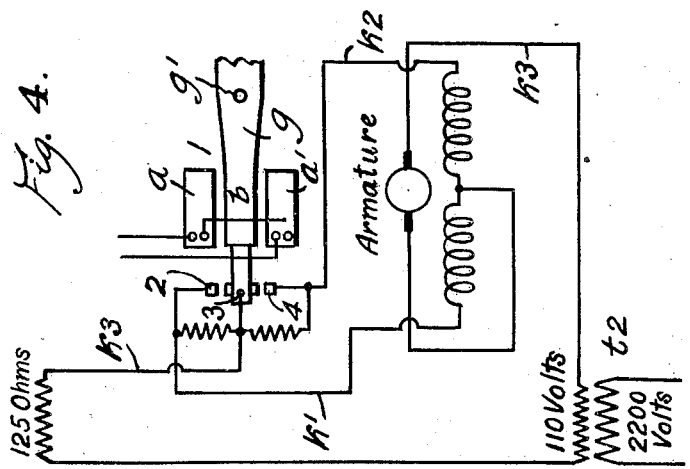
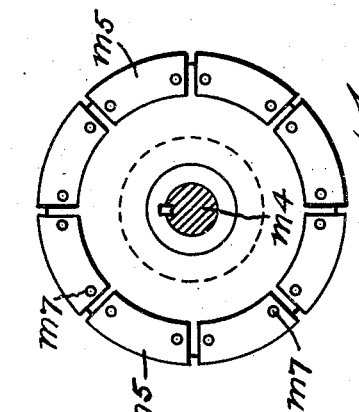
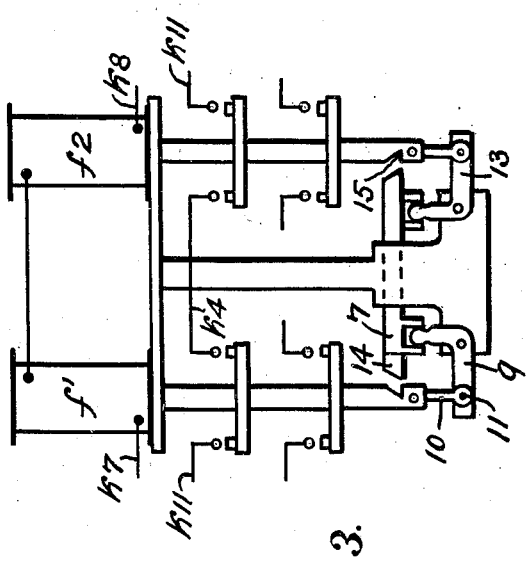
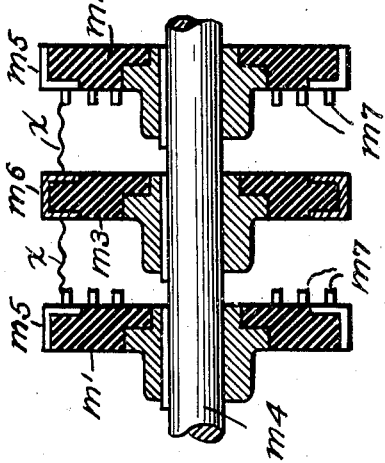
Inventor
Frederick C. Stevey
by Patented May 19, 1936

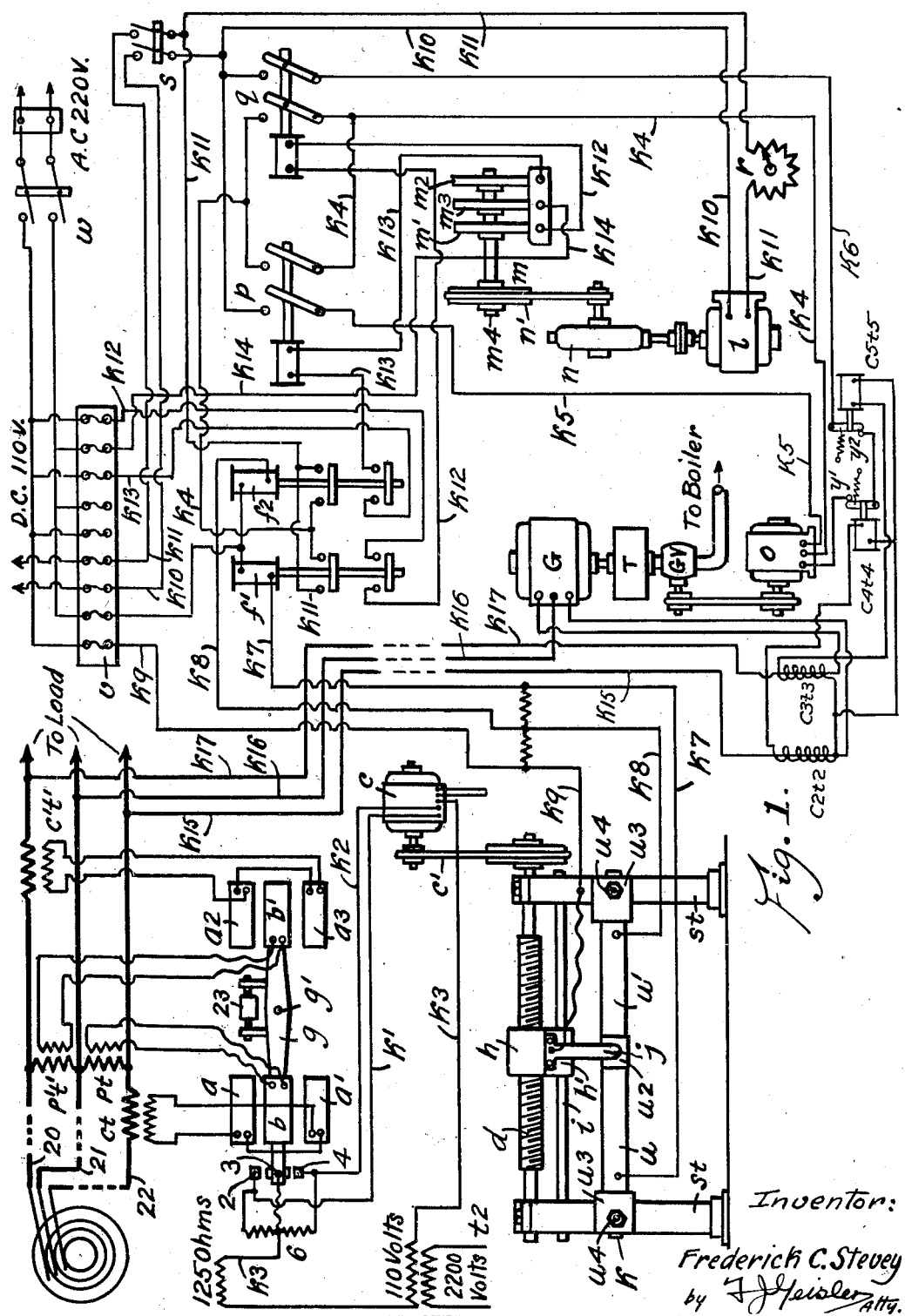

2,041,306

UNITED STATES PATENT OFFICE 2,041,306

AUTOMATIC COORDINATOR FOR MAIN AND AUXILIARY SOURCES OF ELECTRICITY

Frederick C. Stevey, Camas, Wash.

Application April 14, 1934, Serial No. 720,671

10 Claims. (Cl. 171—312)

My invention relates to means for the more economical use of electrical power.

In many large industrial plants using electrical power it is customary to contract with a power company for the purchase of a mean "block" of electrical power at a stipulated rate per month or other period, with the provision that if such block be exceeded the excess, or additional power furnished, shall be paid for at a much higher rate. Since this higher rate is frequently greater than the cost at which the plant could itself supply such occasional need of greater electrical power, by a turbo-generator for example, it is advisable to keep the demand of the plant on the purchased power down to the stipulated maximum level of said block, so as not to incur the higher rates. This may be accomplished, as evident, by the use of a load-sharing auxiliary electrical power system, such as a turbo-generator above mentioned, thrown into action to carry all power demand of the plant in excess of the contracted maximum.

A hand operated control for regulating the auxiliary power system is, however, not feasible. Instead it is necessary that the coordinate use of the main power system and the auxiliary power system by the plant be controlled by some dependable automatic, electrically operated means, responding to the amount of power used by the plant.

The object of my invention is to provide simple and efficient means for that purpose and operating as follows:

An auxiliary generator is synchronized with and tied in with the main source of power supply at all times when my power coordinating system is functioning.

The main power system is used to supply all demand of the plant up to a predetermined maximum amount; and when more than the said maximum amount is required, the throttle valve of the auxiliary power system is automatically opened up more to take care of the excess demand of the plant, thus preventing a greater demand than said maximum amount on the main power system. Furthermore, in order to prevent damage to the auxiliary power system when the excess demand of the plant is greater than a safe predetermined maximum ampere load for the auxiliary power system, the demand of the plant beyond the safe limit of the auxiliary power system is automatically taken from the main system.

I attain my object by furnishing the electric power for the plant from a main source and an auxiliary source of electricity, and by coordinating the said sources thru electrically actuated means adapted primarily to keep the demand on said main source constantly at a predetermined maximum level, and then to control said auxiliary source to supply the demand for power beyond said predetermined load level.

Furthermore, in order to avoid imposing upon the said auxiliary source an undue load, I so arrange the coordinating device that when the demands of the power circuit exceed the predetermined maximum levels of both the main source and auxiliary source of electricity, the further demands of said power circuit will be supplied by the main power system.

These and other features of my invention are hereinafter fully described with reference to the accompanying drawings.

In the drawings:

Fig. 1 shows a diagrammatic view of the set-up of the various elements of my invention, and illustrates the method of its operation;

Fig. 2 shows a vertical section of the part of my device which I designate as a "time selector switch";

Fig. 2a shows the interior face of one of the outer circular disks of my time selector switch;

Fig. 3 illustrates a simple means for interlocking the solenoid switches $f'$ and $f2$ of Fig. 1; and Fig. 4 shows diagrammatically the arrangement of the motor $c$ of Fig. 1.

Referring to Fig. 1; 20, 21, 22 indicate the conductors of a three-phase power system from the main source of electric power, which for convenience we shall assume to be purchased electrical power. $o$ represents a motor to control the governor GV of a turbine T operating a generator G which we shall assume to be the source of auxiliary electrical power, and the power so obtained from this generator will be referred to as auxiliary power. Let it be assumed that the said main power and auxiliary power are to supply the demands of the manufacturing plant and that a predetermined block of electric power from the main source has been contracted for which in case of an excess demand by the plant, is to be supplemented by the auxiliary power.

In order thus to supplement the purchased electrical power when the demand of the plant is greater than the amount contracted for, I provide automatic means, actuated by the power from the main power system, for controlling the operation of the motor $o$, and thus controlling the supply of the auxiliary power to the plant so as to hold the demand on the main power to the the coordination of the main and auxiliary sources of electricity might be employed, that is to say, any electrically actuated means comprising a fixed inductive magnetic element, and a movable inductive element connected with the purchased power supplied to the plant, in which the movable element is adjusted to respond to any change in demand on said purchased power relative to a predetermined maximum load level; the movable element being adjusted to close certain contacts when the demand on said purchased power exceeds said predetermined level, and to close certain other contacts when the demand on said purchased power falls below said predetermined level. Preferably, however, in order to free the said coordinating means from the disturbing effect of exterior magnetic fields, I prefer to employ the device shown in the drawings of my invention. Such device comprises an assembly of fixed coils $a$ and $a'$, and $a2$ and $a3$, each group constituting two halves of a current coil and movable coils $b$, $b'$, the said coils being arranged in a manner similar to the so-called Kelvin balance.

The movable coils $b$, $b'$ are carried on the opposite ends of an arm $g$ which is pivoted at its center $g'$. The fixed coils $a$, $a'$ at the left hand end of the arm $g$ are connected in series with each other and with the secondary of a current transformer $ct$, whose primary is the conductor 22. The fixed coils $a2$ and $a3$ at the right hand end of the arm $g$ are similarly connected in series with each other and with the secondary of the current transformer $c'$ $t'$, whose primary is the conductor 20. The coil $b$ carried by the left hand end of the arm $g$ is connected to the secondary of a potential transformer $pt$ whose primary is connected across the conductors 22, 21. And the coil $b'$ carried by the right hand end of the pivoted arm $g$ is connected in similar manner to the secondary of the potential transformer $p'$ $t'$ whose primary is connected across conductors 20, 21.

Thus I provide two independent load coordinating systems operated by a common movable contact which responds to variations in the demands on the purchased power. Each system consists of a potential coil $b$ or $b'$ mounted between two halves of a current coil $a$ and $a'$ or $a2$ and $a3$. The magnetic flux set up in the potential coils $b$ or $b'$ is proportional to the voltage and the magnetic flux set up in the current coils $a$ and $a'$ or $a2$ and $a3$ is proportional to the current. These magnetic fluxes must react simultaneously in order to cause movement of the arm $g$; if the magnetic flux in the potential coils occurs at one time, and the magnetic flux in the current coils at a different time, no movement of the arm will occur.

The sensitivity of the pivoted arm $g$ to react to variations from predetermined power loads is adjusted by means of a movable weight 23.

The contacts 2 and 4 are connected by wires $k'$ and $k2$ to the terminals of the field winding of the motor $c$.

The motor $c$ is of universal type and may be adapted to be operated either from a 110 v. A. C. or D. C. The control of the motor $c$ is illustrated by Fig. 4. A series parallel arrangement is obtained when both contacts 2 and 4 are open. The two field coils connected by the conductors $k'$ and $k2$ to the contacts 2 and 4 serve alternately as shunt and series fields depending on the direction of rotation of the motor $c$.

Two contacts are provided on the pivoted arm $g$ at 3 and are connected with the wire $k3$ to a 125 ohm or similar resistor and the secondary of the transformer $t2$ (see Fig. 4) by which, let it be assumed, 110 v. potential are supplied through the armature to the center of the field winding of the motor $c$. A spark absorbing resistor 6, Fig. 1, of say about 400 ohms is connected across the gaps between the contacts 2, 3 and 4. The tilting of the arm $g$ causes the movable contact 3 carried by its left hand end to close with one or the other of the fixed contacts 2 or 4, thus completing a circuit thru the motor $c$ thru either conductor $k'$ or $k2$, the circuit thru one contact causing the motor $c$ to be driven in one direction and thru the other contact causing the motor to be driven in the other direction.

The motor $c$, as shown by Fig. 1, by means of a pulley and belt $c'$ turns the screw $d$ which is rotatably mounted in the standards $st$ and carries a threaded nut $h$. To the nut $h$ is attached a fiber or insulating block $h'$ which slides on the guide rod $i$. $k$ denotes a rod fixed in said standards inclosed in an insulating tube. Brass contact sleeves $u$ and $u'$ are mounted on said insulating tube and are separated by an insulating collar $u2$. Insulations $u3$ are also placed at the outer ends of the contact sleeves $u$ and $u'$ and nuts $u4$ screwed on the ends of the rod $k$ secure the assembly in place. A contact finger $j$ is carried by the fiber block $h'$ and is adapted to slide over the brass contact sleeves $u$ and $u'$ and an insulating collar $u2$ between them. The contact finger $j$ may thus be positioned to make contact with either of the contact sleeves $u$ or $u'$, accordingly as the rotation of the screw $d$ moves the nut $h$ to the left or the right. The contact sleeves $u$ and $u'$ are connected to conductors $k7$ and $k8$, respectively, and the contact finger $j$ is connected to the conductor $k9$.

The function of the motor $c$ and the electrical contact which it makes and breaks as described is to drive the motor $o$ operating the governor of the auxiliary power, in one direction or the other, in order to increase or reduce the amount of auxiliary power employed.

The governor motor $o$ is controlled by a system of relays operated by the load coordinating element of my invention, already described and comprising the fixed current coils $a$ and $a'$ and $a2$ and $a3$, and the movable potential coils $b$ or $b'$.

One of the relay elements consists of two solenoid switches $f'$ and $f2$ mechanically interlocked so that only one can be closed at a time, to prevent any possibility of both switches being closed at once and attempting to cause the motor $o$ to be driven simultaneously in opposite directions. When the contact finger $j$ connects with the contact sleeve $u$, the solenoid switches $f'$ are closed, and when the contact finger $j$ is moved to connect with the contact sleeve $u'$, the solenoid switches $f2$ are closed.

Fig. 3 illustrates a simple mechanical means by which the solenoid switches $f'$ and $f2$ are interlocked so that only one may be closed at a time, as mentioned. 9 represents a bell-crank connected by a pin 11 to the link 10 connected to the core of the solenoid switch $f'$, the other end of the bell-crank 9 engages the sliding bar 7 having a beveled end adapted to engage the notch 15 in the core of the solenoid switch $f2$. The raising of the core and contacts of solenoid switch $f'$ causes the sliding bar 7 to be moved to the right and its beveled end to enter said notch 15 of the core of the solenoid switch $f2$, thus preventing the raising of the core and contacts of the switch $f2$ simultaneously. A similar arrangement consisting of a bell-crank 13 in co-operation with the sliding bar 14 prevents the simultaneous raising of the core and contacts of the switch f' when the core of switch f2 is raised.

A fused terminal board for both A. C. and D. C. circuits is shown at v. w and s are switches for A. C. and D. C. currents, respectively. A small D. C. motor l (for example ⅛ H. P. 110 v. with 1200 R. P. M. top speed) is connected thru conductors k10 and k11 and rheostat r with the source of direct current power thru the switch s. The motor l thru a reduction gear n and belt and pulley n' drives the shaft m4 of the interrupter switch m. The reduction gear n may have a speed ratio of 50–1. The interrupter switch m is a rotary switch made up of three fiber disks m', m2 and m3 mounted on the shaft m4. The gear and pulley reduction, n and n', may be arranged to rotate said disk at the rate of about 6 R. P. M. The outer rims of the disks m', m2 are provided with insulated spaced contact segments m5 (see Figs. 2 and 2a) held in place by studs m7. One of the contact segments m5 on each of the disks m' and m2 is connected to the rim of the center disk m3, for example by a wire as x. The effective length of the contact segment m5 to which the wire x connects can be increased by electrically connecting one or more adjacent segments to it by means of conducting links fitting over the studs m7. The disk m3 is provided with a continuous metal outer rim m6. The disks m', m2 and m3 make contacts with the conductors k12, k13 and k14, respectively. The contact made by the disk m3 with the conductor k14 is continuous and forms part of the return circuit.

The motor o is assumed to operate the governor GV of a turbine T driving a generator G by which the auxiliary electrical power is furnished. The said motor o is controlled by the solenoid switches p and q, which in turn are controlled by the solenoid switches f2 and f', respectively, and the intermittent switch m.

The timing of the intermittent switch m may be controlled in two different ways: viz, by changing the speed of the motor l driving the switch m; or by changing the effective length of the insulated contact segments m5 of the disks m' and m2. The speed of the motor l, adjustable by the rheostat r, determining the rate of revolution of the disks m', m2, and m3, governs the number of interruptions per minute in the circuits of the motor o. Varying the number of the segments m5 connected on the disks m', or m2, governs the length of each contact in relation to the period of interruption. The important feature of this intermittent switch m is that, with proper adjustment, load surges on the auxiliary power system are entirely eliminated.

To illustrate the manner of operation of my invention I shall describe its application to the holding of the consumption of purchased electrical power within a contracted maximum block or amount. Let it be assumed that the excitation of the movable potential coils b and b' carried by the pivoted arm g is such that an overload, that is to say a load greater than that contracted for from the purchased power system, causes the arm g to be tilted so as to close the contacts 2 and 3, thus energizing the motor c and causing it to rotate the screw d so as to move the nut h to the left causing the contact finger j to connect with the contact sleeve u. This will close the circuit thru the conductors k7 and k9 causing the solenoid switch f' to close, the closing of the switch f' in turn thru the intermittent switch m will close the relay switch q causing current to pass to and operate the turbine governor motor o in the direction which causes the turbine to furnish auxiliary power and thus, by sharing the demand of the plant, reduce the load on the purchased power system. The solenoid of the relay switch q is connected thru conductor k12 with the disk m' of the intermittent switch m, hence notwithstanding both the upper and lower contacts of the switch f' are closed, the relay switch q will be energized only for short intermittent periods. These periods are adjustable by the rheostat r, and also by the arrangement of the contact segments m5. The purpose of this arrangement is to cause the turbine governing motor o to operate intermittently rather than continuously, thus preventing a load surge on the turbine furnishing the auxiliary power.

Similarly, if there should be an underload on the purchased power system, the pivoted arm g would tilt in the opposite direction, the motor c would be reversed, the contact finger j would contact with the sleeve u', the switch p would close, the turbine motor governor o would be reversed causing the turbine operating the generator to drop load. The generator G will be synchronized with and tied in with the plant power wires or buses 20, 21 and 22, at all times when my power coordinating system is functioning.

My invention can be adapted to systems of any size by choosing appropriate ratios for the current transformers ct and c't' and the potential transformers pt and p't'.

In actual practice I have found that slight fluctuations in the power demand cause almost continuous movement of the arm g. If the arm g were directly connected electrically with the system of switches f' and f2, such fluctuating movement of the said arm g would cause "chattering" of the switch systems f' and f2 and would result in undue wear and strain. This "chattering", however, is avoided by the indirect connecting of the contacts of the arm g and the switch systems f' and f2 thru the motor c and the movable arm j.

It is possible that the demand of the industrial plant for power may at some time exceed the amount which is furnished by the contracted block of purchased power plus the auxiliary power of the turbine driven generator G, which would result in too great a load being placed upon the auxiliary power system causing damage to it. To prevent this I have provided an additional safety feature consisting of a means which prevents the loading of the turbine driven generator of the auxiliary power system beyond a predetermined maximum load, and causes the excess load beyond such point to be supplied by the purchased power system.

As already mentioned, when the demand of the plant for power is greater than that furnished under the contracted amount of purchased power, the governor motor o will be operated thru the switch q to cause the turbine operated generator to furnish the auxiliary electrical power required to meet the excess demands of the plant. But, when the load placed upon the auxiliary power system reaches a predetermined current maximum one of the induction relay switches y' or y2 in the conductor k6 will open and thus prevent the motor o from operating further to increase the load on the auxiliary power system.

The operation of the induction relay switches y' or y2 is illustrated by Fig. 1. k15, k16 and $k17$ represent conductors carrying the power from the auxiliary power system to the plant mains or buses. $y'$ and $y2$ are ampere-limiting induction relay switches held normally closed by spring means but pulled open when the current through the coils $c4t4$ or $c5t5$, connected with transformers $c2t2$ and $c3t3$, respectively, becomes sufficiently strong; that is, the switches $y'$ and $y2$ are so set that they will open when a predetermined current load on the conductors $k15$, $k16$ and $k17$ is reached. The opening of the relay switches $y'$ or $y2$ will break the contact on the conductor $k6$, preventing further operation of the governor motor $o$ to increase the load. Then as soon as the load on the auxiliary power system falls below the predetermined level the induction switches $y'$ or $y2$ will close again.

It is evident from the foregoing description of my invention, that while I have specifically applied it as a means for coordinating a main and an auxiliary source of electrical power furnished to a power circuit, it may be put to other uses.

I claim:

1. In an electric power circuit, including a main source and an auxiliary source of power, electrically actuated means for coordinating the amounts of power supplied by said sources to said power circuit, a control for said auxiliary source, a reversible electrical motor operating said control, said motor having independent circuits controlled by said electrically actuated means, and means interposed in the circuits of said motor adapted to prevent load surges on said auxiliary source of power, the latter means comprising an interrupter switch having non-continuous contact elements arrangeable to vary the lengths of the periods of making contact and of interruption, relatively to each other.

2. In a device of the character described for coordinating main and auxiliary sources of electrical power, including a motor-operated control for said auxiliary power, a rotary switch interposed in the circuits of said control, said rotary switch comprising plural members rotated in unison, said members respectively provided with continuous and non-continuous peripheral contact elements, the effective lengths of said non-continuous contact elements being arrangeable to make the relative lengths of the periods of the closing and of the interruption of the circuits of said control adjustable, whereby the load on said auxiliary source of power may be increased or decreased by a series of predetermined increments or decrements, respectively.

3. In an electric power circuit including a main source and an auxiliary source of power, electrically actuated means for coordinating the amounts of power supplied by said sources to said power circuit, a control for said auxiliary source, a reversible electrical motor operating said control, said motor having independent circuits controlled thru the medium of said electrically actuated means, and an interrupter switch in the circuits of said motor to prevent load surges on said auxiliary source of power, said interrupter switch comprising a rotating spindle carrying plural disks, respectively provided with continuous and with non-continuous peripheral contact surfaces, said non-continuous surfaces comprising segments insulated from each other, and means for connecting adjacent contact segments, whereby to vary the lengths of the periods of making contact, and of interruption, relatively to each other.

4. An electric power system comprising main and auxiliary sources of power, a control for said auxiliary source, a reversible motor operating said control, independent circuits connected with said motor, a solenoid switch in each of said circuits, a movable contact member causing a make-and-break in the circuits operating said solenoid switches, electrically operated means responsive to the load on said main source causing the movement of said contact member, but the movement of such contact member being effected only by prolonged periods of similar phases of action of said electrically operated means; an interrupter element interposed in said independent circuits connected with said motor, thereby to prevent load surges on the said auxiliary source of power, said interrupter element comprising a switch having non-continuous contact elements arrangeable to vary the lengths of the periods of making contact, and of the interruption, relatively to each other.

5. An electric power system comprising main and auxiliary sources of power, a control for said auxiliary source, a reversible motor operating said control, independent circuits connected with said motor, a solenoid switch in each of said circuits, a movable contact member causing a make-and-break in the circuits operating said solenoid switches, electrically operated means responsive to the load on said main source causing the movement of said contact member, but the movement of such contact member being effected only by prolonged periods of similar phases of action of said electrically operated means; an interrupter element interposed in the said independent circuits connected with said motor, thereby to prevent load surges on the said auxiliary source of power, said interrupter element comprising a rotary switch including plural members rotated in unison, provided respectively with continuous and non-continuous contact faces, said non-continuous contact faces comprising segments insulated from each other, the effective lengths of said segments being arrangeable to make the relative lengths of periods of the closing, and of the interruption of the independent circuits connected with said motor adjustable; and thereby enabling the load on said auxiliary source of power to be increased or decreased by a series of predetermined increments or decrements.

6. In an electric power circuit comprising coordinated main and auxiliary sources of power including an electrically operated control of said auxiliary source, means for limiting the contribution of power from the auxiliary source, comprising over-current relays in the circuit of said control, the inductive element of said relays adapted to be energized by the current of said auxiliary source, said relays having movable contact making members normally held closed, and said contacts being adapted to be opened when the current contributed by said auxiliary means to the power circuit rises to a predetermined level, whereby further operation of said control to increase the current contributed by said auxiliary source is prevented, and additional excessive load is borne by the main source of power.

7. In an electric power system comprising coordinated main and auxiliary sources of power, a control for said auxiliary source, a reversible electric motor operating said control, independent circuits connected with said motor, a solenoid switch in each of said circuits; electrically operated means opening and closing the circuits of said solenoids, such means including a contact member lineally reciprocated between the terminals of said solenoid circuits, said terminals arranged to be opened and closed individually by the reciprocation of said contact member, a second reversible electric motor reciprocating said contact member, and an electrically operated device responsive to the load on said main source, said device closing and opening the circuits of said motor; whereby the opening and closing of said solenoid circuits will be only in response to repeated similar phases of action of said device.

8. In an electric power system comprising coordinated main and auxiliary sources of power, a control for said auxiliary source, a reversible electric motor operating said control, independent circuits connected with said motor, a solenoid switch in each of said circuits; electrically operated means opening and closing the circuits of said solenoids, such means including a rotatable, threaded shaft, a contact member reciprocated, by the rotation of said shaft, between the terminals of said solenoid circuits, said terminals arranged to be opened and closed individually by the reciprocation of said contact member, a second reversible electric motor rotating said shaft, and an electrically operated device responsive to the load on said main source, said device closing and opening the circuits of said second motor; whereby the opening and closing of said solenoid circuits will be only in response to repeated similar phases of action of said device.

9. The combination described by claim 7 with said electrically operated device comprising a Kelvin balance closing and opening the circuits of said second motor, said Kelvin balance provided with a movable weight for adjusting the response of said Kelvin balance to variations in the load on said main source.

10. An electric power system comprising main and auxiliary sources of power, a control for said auxiliary source, a motor operating said control; switches in the circuits of said motor, electrically operated means responsive to the load on said main source operating said switches; and means for limiting the contribution of the power from said auxiliary source to a predetermined maximum; said last mentioned means comprising overcurrent relays in the circuit of said motor operating said control, the inductive element of said relays adapted to be energized by the current of said auxiliary source, said relays having movable contact making members normally held closed, and said contacts being adapted to be opened when the current contributed by said auxiliary source to the power circuit rises to a predetermined level; whereby further operation of said motor to cause said control to increase the current contributed by said auxiliary source is prevented until the current contributed by said auxiliary source is reduced.

FREDERICK C. STEVEY.